(12) United States Patent
Eichhorn

(10) Patent No.: US 7,132,515 B2
(45) Date of Patent: Nov. 7, 2006

(54) FIBER-REACTIVE AZO DYES, PREPARATION THEREOF AND USE THEREOF

(75) Inventor: Joachim Eichhorn, Frankfurt (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 78 days.

(21) Appl. No.: 10/511,534

(22) PCT Filed: Apr. 15, 2003

(86) PCT No.: PCT/EP03/03889

§ 371 (c)(1),
(2), (4) Date: Oct. 15, 2004

(87) PCT Pub. No.: WO03/089521

PCT Pub. Date: Oct. 30, 2003

(65) Prior Publication Data

US 2005/0150063 A1    Jul. 14, 2005

(30) Foreign Application Priority Data

Apr. 19, 2002    (DE) ................ 102 17 477

(51) Int. Cl.
| | | |
|---|---|---|
| C09B 62/03 | (2006.01) | |
| C09B 62/09 | (2006.01) | |
| C09B 62/25 | (2006.01) | |
| C09B 62/41 | (2006.01) | |
| C09B 62/513 | (2006.01) | |

(52) U.S. Cl. .............. 534/558; 534/633; 534/634; 534/637; 8/527; 8/549

(58) Field of Classification Search ........ 534/588, 534/633, 634, 637, 558; 8/527, 549
See application file for complete search history.

(56) References Cited

U.S. PATENT DOCUMENTS

| | | |
|---|---|---|
| 5,231,172 A | 7/1993 | Beck et al. |
| 5,529,585 A | 6/1996 | Schrell et al. |
| 5,986,087 A | 11/1999 | Schrell et al. |
| 6,001,995 A | 12/1999 | Schrell et al. |
| 6,011,140 A | 1/2000 | Zamponi et al. |
| 6,537,332 B1 | 3/2003 | Tzikas et al. |

FOREIGN PATENT DOCUMENTS

| | | |
|---|---|---|
| DE | 196 00 765 | 7/1997 |
| EP | 0 538 785 | 4/1993 |
| EP | 0 692 559 | 1/1996 |
| JP | 03056569 | 3/1991 |
| JP | 8060017 | 3/1996 |
| WO | WO-96/37641 | 11/1996 |
| WO | WO-96/37642 | 11/1996 |
| WO | WO-00/06652 | 2/2000 |

OTHER PUBLICATIONS

H. Rath, Lehrbuch der Textilchemie, Springer-Verlag, 3rd Edition (1972) pp. 295-299.
J. Soc. Dyers and Colourists (1972) pp. 93-99.
J. Soc. Dyers and Colourists (1975) pp. 33-37.

*Primary Examiner*—Fiona T. Powers
(74) *Attorney, Agent, or Firm*—Connolly Bove Lodge & Hutz

(57) ABSTRACT

The invention relates to reactive dyes according to the given, defined general formula (I) wherein $D^1$ and $D^2$, R and R*, in addition to M are defined as per claim 1. The invention also relates to a method for producing said dyes and to their use for dyeing or printing fibrous materials containing hydroxy and/or carbonamide groups

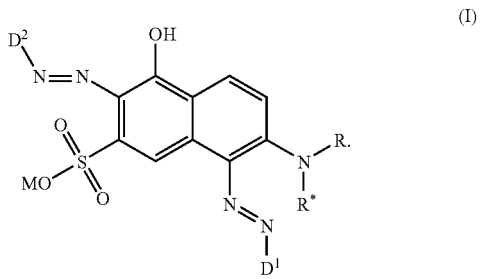

(I)

13 Claims, No Drawings

FIBER-REACTIVE AZO DYES, PREPARATION THEREOF AND USE THEREOF

RELATED APPLICATIONS

This application is a national stage application (under 35 U.S.C. 371) of PCT/EP03/03889 filed Apr. 15, 2003 which claims benefit to German application Serial No. 102 17 477.6 filed Apr. 19, 2002.

This invention relates to the field of fiber-reactive azo dyes.

Fiber-reactive azo dye mixtures and their use for dyeing hydroxyl- and/or carboxamido containing material in yellowish to brownish red hues are known for example from the documents JP 8060017 WO 00/06652 and DE 19600765 A1. However, these have certain performance defects, for example an excessive dependence of the color yield on changing dyeing parameters in the dyeing operation, or an insufficient or unlevel color build-up on cotton (good color build-up follows from the ability of the dye to produce a correspondingly stronger dyeing from an increased concentration of the dye in the dyebath). Possible consequences of these defects are poor reproducibilities for the dyeings which are obtainable, which ultimately compromises the economics of the dyeing operation. Consequently, there continues to be a demand for novel reactive dyes having improved properties, such as high substantivity combined with good wash-off of unfixed portions. They shall moreover provide good dyeing yields and possess high reactivity and they shall more particularly provide dyeings having high degrees of fixation.

The present invention, then, provides dyes which possess these above-described properties to a high degree. The novel dye mixtures should be notable in particular for high fixation yields and ready wash-off of portions not fixed on the fiber. In addition, the dyeings should possess good general fastnesses, such as for example high lightfastness and very good wetfastnesses.

The present invention accordingly provides dyes of the hereinbelow indicated and defined general formula (I)

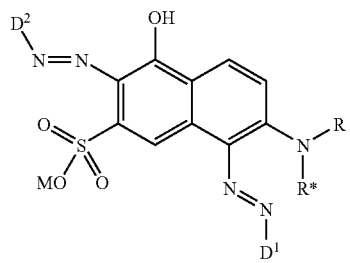

where $D^1$ and $D^2$ are independently a group of the general formula (1)

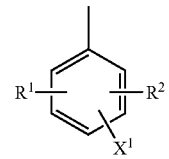

where $R^1$ and $R^2$ are independently hydrogen, $(C_1-C_4)$-alkyl, $(C_1-C_4)$-alkoxy, hydroxyl, sulfo, carboxyl, cyano, nitro, amido, ureido or halogen; and $X^1$ is hydrogen or a group of the formula $-SO_2-Z$, where Z is $-CH=CH_2$, $-CH_2CH_2Z^1$ or hydroxyl, where $Z^1$ is hydroxyl or an alkali-detachable group; or $D^1$ and $D^2$ are independently a naphthyl group of the general formula (2)

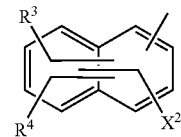

where $R^3$ and $R^4$ are independently hydrogen, $(C_1-C_4)$-alkyl, $(C_1-C_4)$-alkoxy, hydroxyl, sulfo, carboxyl, cyano, nitro, amido, ureido or halogen; and $X^2$ has one of the meanings of $X^1$; or $D^1$ and $D^2$ are independently a group of the general formula (3)

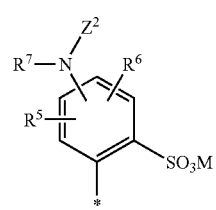

where $R^5$ and $R^6$ independently have one of the meanings of $R^1$ and $R^2$;

$R^7$ is hydrogen, $(C_1-C_4)$-alkyl, unsubstituted or $(C_1-C_4)$-alkyl-, $(C_1-C4)$-alkoxy-, sulfo-, halogen- or carboxyl-substituted phenyl; and $Z^2$ is a group of the general formula (4) or (5) or (6)

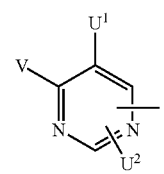

-continued

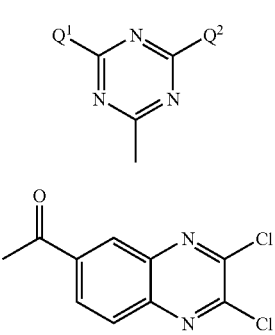
(5)

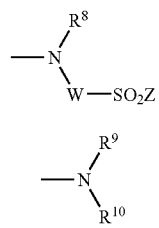
(6)

where

V is fluorine or chlorine;

$U^1$, $U^2$ are independently fluorine, chlorine or hydrogen; and $Q^1$, $Q^2$ are independently chlorine, fluorine, cyanamido, hydroxyl, $(C_1-C_6)$-alkoxy, phenoxy, sulfophenoxy, mercapto, $(C_1-C_6)$-alkylmercapto, pyridino, carboxypyridino, carbamoylpyridino or a group of the general formula (7) or (8)

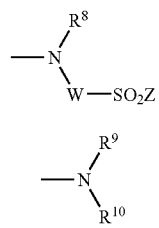
(7)

(8)

where $R^8$ is hydrogen or $(C_1-C_6)$-alkyl, sulfo-$(C_1-C_6)$-alkyl or phenyl unsubstituted or substituted by $(C_1-C_4)$-alkyl, $(C_1-C_4)$-alkoxy, sulfo, halogen, carboxyl, acetamido, ureido;

$R^9$ and $R^{10}$ independently have one of the meanings of $R^8$ or combine to form a cyclic ring system of the formula $—(CH_2)_j—$, where j is 4 or 5, or alternatively $—(CH_2)_2-E-(CH_2)_2—$, where E is oxygen, sulfur, sulfo, $—NR^{11}$ where $R^{11}=$ $(C_1-C_6)$-alkyl;

W is phenylene which is unsubstituted or substituted by 1 or 2 substituents, such as $(C_1-C_4)$-alkyl, $(C_1-C_4)$-alkoxy, carboxyl, sulfo, chlorine, bromine, or is $(C_1-C_4)$-alkylene-arylene or $(C_2-C_6)$-alkylene, which can be interrupted by oxygen, sulfur, sulfo, amino, carbonyl, carboxamido, or is phenylene-CONH-phenylene, which is unsubstituted or substituted by $(C_1-C_4)$-alkyl, $(C_1-C_4)$-alkoxy, hydroxyl, sulfo, carboxyl, amido, ureido or halogen, or is naphthylene which is unsubstituted or substituted by 1 or 2 sulfo groups; and Z is as defined above; or $D^1$ and $D^2$ are independently a group of the general formula (9)

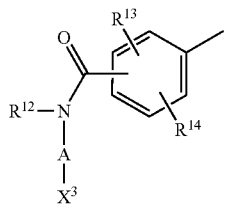
(9)

where $R^{12}$ is hydrogen, $(C_1-C_4)$-alkyl, aryl or a substituted aryl radical;

$R^{13}$ and $R^{14}$ are independently hydrogen, $(C_1-C_4)$-alkyl, $(C_1-C_4)$-alkoxy, hydroxyl, sulfo, carboxyl, cyano, nitro, amido, ureido or halogen; and A is a phenylene group of the general formula (10)

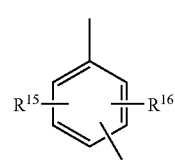
(10)

where $R^{15}$ and $R^{16}$ are independently hydrogen, $(C_1-C_4)$-alkyl, $(C_1-C_4)$-alkoxy, hydroxyl, sulfo, carboxyl, cyano, nitro, amido, ureido or halogen; or a naphthylene group of the general formula (11)

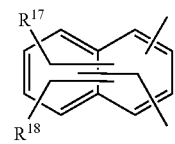
(11)

where $R^{17}$ and $R^{18}$ are independently hydrogen, $(C_1-C_4)$-alkyl, $(C_1-C_4)$-alkoxy, hydroxyl, sulfo, carboxyl, cyano, nitro, amido, ureido or halogen; or a polymethylene group of the general formula (12)

$—(CR^{19}R^{20})_k—$ (12)

where k is a whole number greater than 1 and $R^{19}$ and $R^{20}$ are independently hydrogen, $(C_1-C_4)$-alkyl, $(C_1-C_4)$-alkoxy, hydroxyl, cyano, amido, halogen or aryl; and $X^3$ has one of the meanings of $X^1$; and R, R* are independently hydrogen, $(C_1-C_4)$-alkyl or sulfomethyl; and M is hydrogen, an alkali metal or one equivalent of an alkaline earth metal, with the proviso that the dyes of the general formulae (I) contain at least one fiber-reactive group of the general formula (4) or (6).

The individual symbols in the general formulae above and below can have identical or different meanings under their definition, irrespective of whether the symbols bear the same or a different designation.

(C$_1$–C$_4$)-Alkyl R may be straight-chain or branched and is in particular methyl, ethyl, n-propyl, isopropyl, n-butyl, isobutyl, sec-butyl or tert-butyl. Methyl and ethyl are preferred. The same logic applies to (C$_1$–C$_4$)-alkoxy groups.

Aryl R is in particular phenyl. Substituted aryl $R^8$ to $R^{10}$ or $R^{12}$ is in particular phenyl substituted by one, two or three independent groups selected from the group consisting of (C$_1$–C$_4$)-alkyl, (C$_1$–C$_4$)-alkoxy, hydroxyl, sulfo, carboxyl, amido and halogen.

Halogen R is in particular fluorine, chlorine or bromine, and fluorine and chlorine are preferred.

Alkali-eliminable $Z^1$ in the β-position of the ethyl group of Z include for example halogen atoms, such as chlorine and bromine, ester groups of organic carboxylic and sulfonic acids, as of alkylcarboxylic acids, substituted or unsubstituted benzenecarboxylic acids and substituted or unsubstituted benzenesulfonic acids, such as alkanoyloxy of 2 to 5 carbon atoms, especially acetyloxy, benzoyloxy, sulfobenzoyloxy, phenylsulfonyloxy and toluylsulfonyloxy, also acidic ester groups of inorganic acids, as of phosphoric acid, sulfuric acid and thiosulfuric acid (phosphato, sulfato and thiosulfato groups), similarly dialkylamino groups having alkyl groups of 1 to 4 carbon atoms in each case, such as dimethylamino and diethylamino.

Z is preferably vinyl, β-chloroethyl and particularly preferably β-sulfatoethyl.

The groups "sulfo", "carboxyl", "thiosulfato", "phosphato" and "sulfato" include not only their acid form but also their salt form. Accordingly, sulfo groups are groups conforming to the general formula —SO$_3$M, thiosulfato groups are groups conforming to the general formula —S—SO$_3$M, carboxyl groups are groups conforming to the general formula —COOM, phosphato groups are groups conforming to the general formula —OPO$_3$M$_2$ and sulfato groups are groups conforming to the general formula —OSO$_3$M, in each of which M is as defined above.

The dyes of the general formula (I) may possess different fiber-reactive groups —SO$_2$Z within the meaning of Z. More particularly, the fiber-reactive groups —SO$_2$Z may be on the one hand vinylsulfonyl groups and on the other —CH$^2$CH$_2$Z$^1$ groups, preferably β-sulfatoethylsulfonyl groups. If the dyes of the general formula (I) contain vinyl-sulfonyl groups in some instances, then the fraction of the respective dye with the vinylsulfonyl group is up to about 30 mol %, based on the respective amount of total dye.

Alkali M is in particular lithium, sodium or potassium. M is preferably hydrogen or sodium.

$R^1$ and $R^2$ are preferably hydrogen, (C$_1$–C$_4$)-alkyl groups, (C$_1$–C$_4$)-alkoxy groups, sulfo or carboxyl and more preferably hydrogen, methyl, methoxy or sulfo.

$R^3$ to $R^5$ and $R^{12}$ to $R^{20}$ are preferably hydrogen, $R^3$ to $R^6$, $R^{17}$ and $R^{18}$ are also preferably sulfo.

$R^7$ to $R^{10}$ are preferably hydrogen or methyl, $R^7$ and $R^8$ are also preferably phenyl and $R^9$ and $R^{10}$ are preferably 2-sulfoethyl, 2-, 3- or 4-sulfophenyl or $R^9$ and $R^{10}$ combine to form a cyclic ring system which preferably conforms to the formula —(CH$_2$)$_2$—O—(CH$_2$)$_2$—.

Examples of groups $D^1$ and $D^2$ of the general formulae (1) and (2) are 2-(β-sulfato-ethylsulfonyl)-phenyl, 3-(β-sulfato-ethylsulfonyl)-phenyl, 4-(β-sulfatoethylsulfonyl)-phenyl, 2-Carboxy-5-(β-sulfatoethylsulfonyl)-phenyl, 2-chloro-4-(β-sulfatoethyl-sulfonyl)-phenyl, 2-chloro-5-(β-sulfatoethylsulfonyl)-phenyl, 2-bromo-4-(β-sulfato-ethylsulfonyl)-phenyl, 2-sulfo-4-(β-sulfatoethylsulfonyl)-phenyl, 2-sulfo-5-(β-sulfato-ethylsulfonyl)-phenyl, 2-methoxy-5-(β-sulfatoethylsulfonyl)-phenyl, 2-ethoxy-5-(β-sulfatoethylsulfonyl)-phenyl, 2,5-dimethoxy4-(β-sulfatoethylsulfonyl)-phenyl, 2-methoxy-5-methyl4-(β-sulfatoethylsulfonyl)-phenyl, 2-methyl-4-(β-sulfatoethyl-sulfonyl)-phenyl, 2- or 3- or 4-(β-thiosulfatethylsulfonyl)-phenyl, 2-methoxy-5-(β-thiosulfatoethylsulfonyl)-phenyl, 2-sulfo-4-(β-phosphatoethylsulfonyl)-phenyl, 2- or 3- or 4-vinylsulfonyl-phenyl, 2-sulfo-4-vinylsulfonyl-phenyl, 2-chloro-4-(β-chloro-ethylsulfonyl)-phenyl, 2-chloro-5-(β-chloroethylsulfonyl)-phenyl, 3- or 4-(β-acetoxyethylsulfonyl)-phenyl, 6- or 8-(β-sulfatoethylsulfonyl)-naphth-2-yl, 6-(β-sulfatoethylsulfonyl)-1-sulfo-napth-2-yl and 8-(β-sulfatoethylsulfonyl)-6-sulfo-naphth-2-yl, preferably 3-(β-sulfatoethylsulfonyl)-phenyl, 4-(β-sulfatoethylsulfonyl)-phenyl, 2-sulfo-4-(β-sulfatoethylsulfonyl)-phenyl, 2-methoxy-5-(β-sulfato-ethylsulfonyl)-phenyl, 2,5-dimethoxy4-(β-sulfatoethylsulfonyl)-phenyl, 2-methoxy-5-methyl-4-(β-sulfatoethylsulfonyl)-phenyl and 3- or 4-vinylsulfonyl-phenyl, or $D^1$ and $D^2$ conform to a group of the general formula (3) or (9) where $R^5$ to $R^7$ and $R^{12}$ to $R^{14}$ have the above-described preferred meanings.

When $D^1$ or $D^2$ is a group of the general formula (2), the bond which leads to the diazo group is preferably attached to the naphthalene nucleus in the β-position.

When A is phenylene and $X^3$ is —SO$_2$Z, the SO$_2$Z group is preferably disposed meta or para relative to the nitrogen atom. In the group of the general formula (9), the carboxamide group is preferably disposed para or meta relative to the diazo group. When A is naphthylene, the bond leading to the nitrogen atom is preferably attached to the naphthalene nucleus in the β-position.

Examples of substituents A are in particular 1,2-phenylene, 1,3-phenylene, 1,4-phenylene, 2-chloro-1,4-phenylene, 2-Chloro-1,5-phenylene, 2-bromo-1,4-phenylene, 2-sulfo-1,4-phenylene, 2-sulfo-1,5-phenylene, 2-methoxy-1,5-phenylene, 2-ethoxy-1,5-phenylene, 2,5-dimethoxy-1,4-phenylene, 2-methoxy-5-methyl-1,4-phenylene, 2-methyl-1,4-phenylene, 2,6-naphthylene, 2,8-naphthylene, 1-sulfo-2,6-naphthylene, 6-sulfo-2,8-naphthylene or 1,2-ethylene and 1,3-propylene.

A is particularly preferably 1,3-phenylene, 1,4-phenylene, 2-sulfo-1,4-phenylene, 2-methoxy-1,5-phenylene, 2,5-dimethoxy-1,4-phenylene, 2-methoxy-5-methyl-1,4-phenylene or 1,2-ethylene and 1,3-propylene, and in the case of the two last-mentioned alkylene groups $R^1$ is preferably phenyl or 2-sulfophenyl.

k is preferably 2 or 3.

W is preferably 1,3-phenylene, 1,4-phenylene, 2-sulfo-1,4-phenylene, 2-methoxy-1,5-phenylene, 2,5-dimethoxy-1,4-phenylene, 2-methoxy-5-methyl-1,4-phenylene, 1,2-ethylene, 1,3-propylene.

Examples of the groups $Q^1$ and $Q^2$ in the general formula (5) are independently fluorine, chlorine, hydroxyl, methoxy, ethoxy, phenoxy, 3-sulfophenoxy, 4-sulfophenoxy, methylmercapto, cyanamido, amino, methylamino, ethylamino, morpholino, piperidino, phenylamino, methylphenylamino, 2-sulfophenylamino, 3-sulfophenylamino, 4-sulfophenylamino, 2,4-disulfophenylamino, 2,5-disulfophenylamino, 2-sulfoethylamino, N-methyl-2-sulfoethylamino, pyridino, 3-carboxypyridino, 4-carboxypyridino, 3-carbamoylpyridino, 4-carbamoylpyridino, 2-(2-sulfatoethylsulfonyl)-phenylamino, 3-(2-sulfatoethylsulfonyl)-phenylamino, 4-(2-sulfatoethylsulfonyl)-phenylamino, N-ethyl-3-(2-sulfatoethylsulfonyl)-phenylamino, N-ethyl-4-(2-sulfatoethylsulfonyl)-phenylamino, 2-Carboxy-5-(2-sulfatoethylsulfonyl)-phenylamino), 2-Chloro4-(2-sulfatoethylsulfonyl)-phenylamino, 2-chloro-5-(2-sulfatoethylsulfonyl)-phenylamino, 2-bromo-4-(2-sulfatoethylsulfonyl)-phenylamino, 2-sulfo-4-(2- sulfatoethylsulfonyl)-phenylamino, 2-sulfo-5-(2-sulfatoethylsulfonyl)phenylamino, 2-methoxy-5-(2-sulfatoethylsulfonyl)-phenylamino, 2,5-dimethoxy-4-(2-sulfatoethylsulfonyl)-phenylamino, 2-methoxy-5-methyl-4-(2-sulfatoethylsulfonyl)-phenylamino, 2-methyl-4-(2-sulfatoethylsulfonyl)-phenylamino, 2-(vinylsulfonyl)-phenylamino, 3-(vinylsulfonyl)-phenylamino, 4-(vinylsulfonyl)-phenylamino, N-ethyl-3-(vinylsulfonyl)-phenylamino, N-ethyl-4-(vinylsulfonyl)-phenylamino, 6-(2-sulfatoethylsulfonyl)-naphth-2-ylamino, 8-(2-sulfatoethyl-sulfonyl)-naphth-2-ylamino, 8-(2-sulfatoethyl-sulfonyl)-6-sulfo-naphth-2-ylamino, 3-(2-(2-sulfatoethylsulfonyl)-ethylcarbamoyl)-phenylamino, 4-(2-(2-sulfatoethylsulfonyl)-ethylcarbamoyl)-phenylamino, 3-(2-(vinylsulfonyl)-ethylcarbamoyl)-phenylamino, 4-(2-(vinylsulfonyl)-ethylcarbamoyl)-phenylamino, 4-(N-methyl-2-(2-sulfatoethylsulfonyl)-ethylcarbamoyl)-phenylamino, 4-(N-phenyl-2-(2-sulfatoethylsulfonyl)ethylcarbamoyl)phenylamino, 4-(3-(2-sulfatoethylsulfonyl)-phenylcarbamoyl)-phenylamino, 4-(4-(2-sulfatoethyl-sulfonyl)-phenylcarbamoyl)-phenylamino, 3-(3-(2-sulfatoethylsulfonyl)-phenyl-carbamoyl)-phenylamino, 3-(4-(2-sulfatoethylsulfonyl)-phenylcarbamoyl)-phenylamino, 3-(2-sulfatoethylsulfonyl)-propylamino, N-methyl-N-(2-(2-sulfatoethylsulfonyl)-ethyl)-amino, N-phenyl-N-(2-(2-sulfatoethylsulfonyl)-ethyl)-amino, N-phenyl-N-(3-(2-sulfatoethylsulfonyl)-propyl)-amino.

Preferably, the groups $Q^1$ and $Q^2$ in the general formula (5) are independently fluorine, chlorine, cyanamido, morpholino, 2-sulfophenylamino, 3-sulfophenyl-amino, 4-sulfophenylamino, N-methyl-2-sulfoethylamino, 3-carboxypyridino, 4-carboxypyridino, 3-carbamoylpyridino, 4-carbamoylpyridino, 3-(2-sulfatoethyl-sulfonyl)-phenylamino, 4-(2-sulfatoethylsulfonyl)-phenylamino, 3-(vinylsulfonyl)-phenylamino, 4-(vinylsulfonyl)-phenylamino, 4-(3-(2-sulfatoethylsulfonyl)-phenylcarbamoyl)-phenylamino, 4-(4-(2-sulfatoethylsulfonyl)-phenylcarbamoyl)-phenylamino, 3-(3-(2-sulfatoethylsulfonyl)-phenylcarbamoyl)-phenylamino, 3-(4-(2-sulfatoethylsulfonyl)-phenylcarbamoyl)-phenylamino, N-methyl-N-(2-(2-sulfatoethylsulfonyl)-ethyl)-amino, N-phenyl-N-(2-(2-sulfatoethylsulfonyl)-ethyl)-amino.

More preferably, the groups $Q^1$ and $Q^2$ in the general formula (5) are independently fluorine, chlorine, cyanamido, morpholino, 2-sulfophenylamino, 3-sulfophenylamino, 4-sulfophenylamino, 3-(2-sulfatoethylsulfonyl)-phenylamino, 4-(2-sulfatoethylsulfonyl)-phenylamino, 3-(vinylsulfonyl)-phenylamino, 4-(vinyl-sulfonyl)-phenylamino, N-methyl-N-(2-(2-sulfatoethylsulfonyl)-ethyl)-amino, N-phenyl-N-(2-(2-sulfatoethylsulfonyl)-ethyl)-amino.

Examples of the group $Z^2$ are 2,4-difluoro-pyrimidin-6-yl, 4,6-difluoro-pyrimidin-2-yl, 5-chloro-2,4-difluoro-pyrimidin-6-yl, 5-chloro-4,6-difluoro-pyrimidin-2-yl, 4,5-difluoro-pyrimidin-6-yl, 5-chloro4-fluoro-pyrimidin-6-yl, 2,4,5-trichloro-pyrimidin-6-yl, 4,5-dichloro-pyrimidin-6-yl, 2,4-dichloro-pyrimidin-6-yl, 4-fluoro-pyrimidin-6-yl, 4-chloro-pyrimidin-6-yl, or a group of the general formula (5) having the above-indicated examples of $Q^1$ and $Q^2$ or 2,3-dichloroquinoxaline-6-carbonyl.

Preferably, $Z^2$ is 2,4-difluoro-pyrimidin-6-yl, 4,6-difluoro-pyrimidin-2-yl, 5-chloro-2,4-difluoro-pyrimidin-6-yl, 5-chloro-4,6-difluoro-pyrimidin-2-yl or a group of the general formula (5) having the above-indicated preferred groups $Q^1$ and $Q^2$.

More preferably, $Z^2$ is 2,4-difluoro-pyrimidin-6-yl, 5-Chloro-2,4-difluoro-pyrimidin-6-yl or a group of the general formula (5) having the above-indicated particularly preferred groups $Q^1$ and $Q^2$.

Preferred dyes conform to the general formula (Ia)

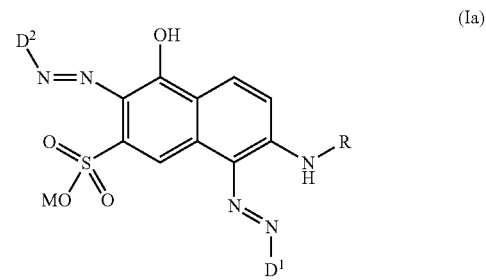

(Ia)

In the general formula (Ia), $D^1$, $D^2$, M and R have the abovementioned meanings.

Optionally, the dye mixtures according to the present invention can also contain one or more monoazo dyes of the general formulae (13), (14) or (15) in an amount of up to 10% by weight and preferably up to 5% by weight,

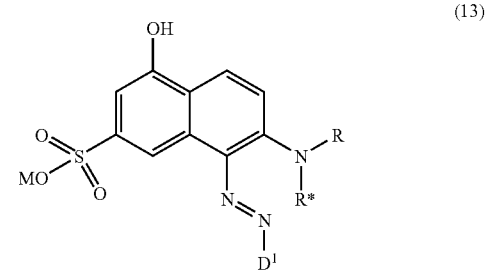

(13)

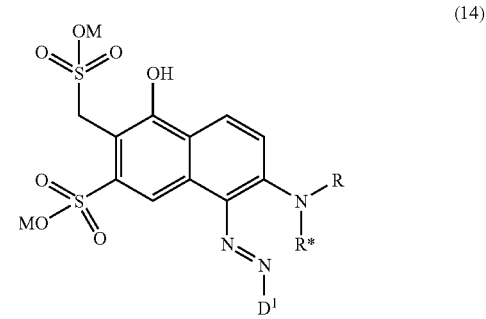

(14)

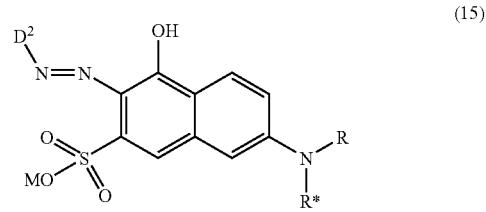

(15)

where $D^1$, $D^2$, R, R* and M have the abovementioned meanings. More preferably, R* is hydrogen.

The dyes according to the invention can be present as a preparation in solid or liquid (dissolved) form. In solid form, they contain, to the extent necessary, the electrolyte salts customary in the case of water-soluble and especially fiber-reactive dyes, such as sodium chloride, potassium chloride and sodium sulfate, and may further contain the auxiliaries customary in commercial dyes, such as buffer substances capable of setting a pH in aqueous solution between 3 and 7, for example sodium acetate, sodium citrate, sodium borate, sodium bicarbonate, sodium dihydrogenphosphate and disodium hydrogenphosphate, also dyeing auxiliaries, dustproofing agents and small amounts of siccatives; when they are present in a liquid, aqueous solution (including a content of thickeners of the type customary in print pastes), they may also contain substances which ensure a long life for these preparations, for example mold preventatives.

In solid form, the dyes according to the invention are generally present as powders or granules which contain electrolyte salt and which will hereinbelow generally be referred to as a preparation with or without one or more of the abovementioned auxiliaries. In the preparations, the dyes are present at 20 to 90% by weight, based on the preparation containing it. The buffer substances are generally present in a total amount of up to 5% by weight, based on the preparation.

When the dyes according to the invention are present in an aqueous solution, the total dye content of these aqueous solutions is up to about 50% by weight, for example between 5 and 50%, the electrolyte salt content of these aqueous solutions preferably being below 10% by weight, based on the aqueous solution; the aqueous solutions (liquid preparations) can contain the aforementioned buffer substances in an amount which is generally up to 5% by weight and preferably up to 2% by weight.

Dyes of the general formulae (13), (14) and (15) are in some instances formed during the synthesis of dyes of the general formula (I).

The dyes according to the invention are preparable for example by one equivalent of an amine of the general formula (16)

$D^1$-NH$_2$ (16), where $D^1$ is as defined above being diazotized in conventional manner and the resulting diazonium compound being reacted in a first stage with an aqueous solution or suspension of one equivalent of a coupling component as per the general formula (17)

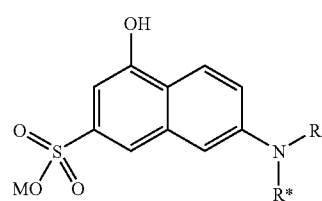

(17)

where R, R* and M are each as defined above, in an acidic medium to form a monoazo dye as per the general formula (13) and subsequently one equivalent of an amine of the general formula (18)

$D^2$-NH$_2$ (18), where $D^2$ is as defined above, being diazotized in conventional manner and the resulting diazonium compound being coupled in the second stage with the monoazo dye of the general formula (13) obtained in the first stage to form the disazo dye of the general formula (I).

When the groups $D^1$ and $D^2$ as per the general formulae (I) have the same meaning, the preparation can be effected by two equivalents of an amine of the general formula (16) where $D^1$ is as defined above being diazotized in conventional manner and reacted in a first stage in an acidic medium with one equivalent of a coupling component of the general formula (17) to form a monoazo dye of the general formula (13) and the second coupling to the disazo dye of the general formula (I) where the groups $D^1$ and $D^2$ have the same meaning being carried out subsequently by increasing the pH.

The dyes of the general formula (I) according to the invention are isolated in a conventional manner by salting out for example with sodium chloride or potassium chloride or by spray drying or evaporating.

It is similarly possible for the as-synthesized solutions of the dyes of the general formula (I) to be directly used as liquid preparations for dyeing, where appropriate after addition of a buffer substance and where appropriate after concentrating.

Dyes which as well as β-chloroethylsulfonyl or (β-thiosulfatoethylsulfonyl or β-sulfatoethylsulfonyl groups also contain vinylsulfonyl groups as reactive radicals can be synthesized not only starting from appropriately substituted vinylsulfonylanilines or naphthylamines but also by reaction of a dye mixture where Z is β-chloroethyl, β-thiosulfatoethyl or β-sulfatoethyl with an amount of alkali required for the desired fraction and converting the δ-substituted ethylsulfonyl groups mentioned into vinylsulfonyl groups. This conversion is effected in a manner familiar to one skilled in the art.

The dyes of the general formula (I) according to the invention have useful application properties. They are used for dyeing or printing hydroxyl- and/or carboxamido-containing materials, for example in the form of sheetlike structures, such as paper and leather or of films, for example composed of polyamide, or in bulk, as for example polyamide and polyurethane, but especially for dyeing and printing these materials in fiber form. Similarly, the as-synthesized solutions of the dyes of the general formula (I) according to the invention can be used directly as a liquid preparation for dyeing, if appropriate after addition of a buffer substance and if appropriate after concentration or dilution.

The present invention thus also provides for the use of the dyes of the general formula (I) according to the invention for dyeing or printing these materials, or rather processes for dyeing or printing these materials in a conventional manner, by using a dye according to the invention as a colorant. The materials are preferably employed in the form of fiber materials, especially in the form of textile fibers, such as woven fabrics or yarns, as in the form of hanks or wound packages.

Hydroxyl-containing materials are those of natural or synthetic origin, for example cellulose fiber materials or their regenerated products and polyvinyl alcohols. Cellulose fiber materials are preferably cotton; but also other vegetable fibers, such as linen, hemp, jute and ramie fibers; regenerated cellulose fibers are for example staple viscose and filament viscose and also chemically modified cellulose fibers, such as aminated cellulose fibers or fibers as described for example in WO 96/37641 and WO 96/37642 and also in EP-A-0 538 785 and EP-A-0 692 559.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The dyes of the general formula (I) according to the invention can be applied to and fixed on the substrates mentioned, especially the fiber materials mentioned, by the application techniques known for water-soluble dyes and especially for fiber-reactive dyes. For instance, on cellulose fibers they produce by the exhaust method from a long liquor and also from a short liquor, for example in a liquor to goods ratio of 5:1 to 100:1, preferably 6:1 to 30:1, using various acid-binding agents and optionally neutral salts as far as necessary, such as sodium chloride or sodium sulfate, dyeings having very good color yields. Application is preferably from an aqueous bath at temperatures between 40 and 105° C., optionally at a temperature of up to 130° C. under superatmospheric pressure, but preferably at 30 to 95° C., especially 45 to 65° C., in the presence or absence of customary dyeing auxiliaries. One possible procedure here is to introduce the material into the warm bath and to gradually heat the bath to the desired dyeing temperature and complete the dyeing process at that temperature. The neutral salts which accelerate the exhaustion of the dyes may also if desired only be added to the bath after the actual dyeing temperature has been reached.

Padding processes likewise provide excellent color yields and a very good color build-up on cellulose fibers, the dyes being fixable in a conventional manner by batching at room temperature or elevated temperature, for example at up to 60° C., or in a continuous manner, for example by means of a pad-dry-pad steam process, by steaming or using dry heat.

Similarly, the customary printing processes for cellulose fibers, which can be carried out in one step, for example by printing with a print paste containing sodium bicarbonate or some other acid-binding agent and by subsequent steaming at 100 to 103° C., or in two steps, for example by printing with a neutral to weak acidic print color and then fixing either by passing the printed material through a hot electrolyte-containing alkaline bath or by overpadding with an alkaline electrolyte-containing padding liquor and subsequent batching of the alkali-overpadded material or subsequent steaming or subsequent dry heat treatment of the alkali-overpadded material, produce strong prints with well-defined contours and a clear white ground. The outcome of the prints is little affected, if at all, by variations in the fixing conditions.

When fixing by means of dry heat in accordance with the customary thermofix processes, hot air at 120 to 200° C. is used. In addition to the customary steam at 101 to 103° C., it is also possible to use superheated steam and high-pressure steam at temperatures of up to 160° C.

The acid-binding agents which effect the fixation of the dyes of the general formula (I) according to the invention on the cellulose fibers are for example water-soluble basic salts of alkali metals and likewise alkaline earth metals of inorganic or organic acids or compounds which liberate alkali in the heat, and also alkali metal silicates. Especially suitable are the alkali metal hydroxides and alkali metal salts of weak to medium inorganic or organic acids, the preferred alkali metal compounds being the sodium and potassium compounds. Such acid-binding agents are for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, trisodium phosphate waterglass or mixtures thereof, for example mixtures of aqueous sodium hydroxide solution and waterglass.

The dyes of the general formula (I) according to the invention are notable for outstanding color strength when applied to the cellulose fiber materials by dyeing or printing in the presence of no or very small amounts of alkali or alkaline earth metal compounds. For instance, no electrolyte salt is required for a shallow depth of shade, not more than 5 g/l of electrolyte salt is required for a medium depth of shade and not more than 10 g/l of electrolyte salt is required for deep shades.

According to the invention, a shallow depth of shade refers to the use of 2% by weight of dye based on the substrate to be dyed, a medium depth of shade refers to the use of 2 to 4% by weight of dye based on the substrate to be dyed and a deep shade refers to the use of 4 to 10% by weight of dye based on the substrate to be dyed.

The dyeing and prints obtainable with the dyes of the general formula (I) according to the invention possess bright shades; more particularly, the dyeings and prints on cellulose fiber materials possess good lightfastness and especially good wetfastnesses, such as fastness to washing, milling, water, seawater, crossdyeing and acidic and alkaline perspiration, also good fastness to pleating, hotpressing and rubbing. Furthermore, the cellulose dyeings obtained following the customary aftertreatment of rinsing to remove unfixed dye portions exhibit excellent wetfastnesses, in particular since unfixed dye portions are easily washed off because of their good solubility in cold water.

Furthermore, the dyes of the general formula (I) according to the invention can also be used for the fiber-reactive dyeing of wool. Moreover, wool which has been given a nonfelting or low-felting finish (cf. for example H. Rath, Lehrbuch der Textilchemie, Springer-Verlag, 3rd edition (1972), pages 295–299, especially finished by the Hercoseft process (page 298); J. Soc. Dyers and Colourists 1972, 93–99, and 1975, 33–44), can be dyed to very good fastness properties. The process of dyeing on wool is here carried out in a conventional manner from an acidic medium. For instance, acetic acid and/or ammonium sulfate or acetic acid and ammonium acetate or sodium acetate can be added to the dyebath to obtain the desired pH. To obtain a dyeing of acceptable levelness, it is advisable to add a customary leveling agent, for example a leveling agent based on a reaction product of cyanuric chloride with three times the molar amount of an aminobenzenesulfonic acid and/or of an aminonaphthalenesulfonic acid or on the basis of a reaction product of for example stearylamine with ethylene oxide. For instance, the dye of the general formula (I) according to the invention is preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C. Since the water solubility of the dyes of the general formula (I) according to the invention is very good, they can also be used with advantage in customary continuous dyeing processes. The color strength of the dyes according to the invention is very high.

The dyes of the general formula (I) according to the invention dye the materials mentioned, preferably fiber materials, in yellowish to brownish red shades having good fastness properties.

The examples hereinbelow serve to illustrate the invention. Parts and percentages are by weight, unless otherwise stated. Parts by weight relate to parts by volume as the kilogram relative to the liter. The compounds described in the examples in terms of a formula are indicated in the form of the free acids, since they are generally prepared and isolated in the form of their salts, preferably sodium or potassium salts, and used for dyeing in the form of their salts. The starting compounds described in the examples hereinbelow, especially the table examples, can be used in the synthesis in the form of the free acid or likewise in the form of their salts, preferably alkali metal salts, such as sodium or potassium salts. The reported UV/Vis absorption maxima were determined in water as a solvent.

EXAMPLE 1 a) 302 parts of the product obtained by condensation of 134 parts of 2,4,6-trifluoro-pyrimidine with 188 parts of 2 4-diaminobenzenesulfonic acid are suspended in 2 500 parts of ice-water and 350 parts of 30% hydrochloric acid and diazotized at 5° C. by dropwise addition of 175 parts of 40% sodium nitrite solution. After the excess nitrite has been removed with sulfamic acid, 333 parts are added of 4-hydroxy-7-(sulfomethyl-amino)-naphthalene-2-sulfonic acid, prepared by reaction of 239 parts of 7-amino-4-hydroxy-naphthalene-2-sulfonic acid with 147 parts of formaldehyde sodium bisulfite in an aqueous medium at pH 5.5–6 and 40–50° C., and a coupling reaction is carried out at 5–10° C. and below pH 1.5 to form a reddish orange monoazo dye of the formula (13-1).

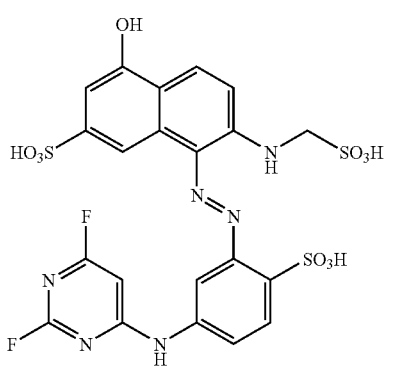

(13-1)

b) In a second, separate reaction vessel, 281 parts of 4-(β-sulfatoethylsulfonyl)-aniline are suspended in 700 parts of ice-water and 180 parts of 30% hydrochloric acid and diazotized by dropwise addition of 174 parts of 40% sodium nitrite solution. Subsequently the excess nitrite is removed with sulfamic acid solution and the diazo suspension obtained is pumped after the first coupling has ended into the solution of the monoazo dye (13-1) of a) while at the same time pH 5–6 is set and contained with sodium carbonate at below 25° C.

The yellowish red disazo dye of the formula (I-1) which is formed after the second coupling reaction has ended can be isolated by spray drying or evaporating under reduced pressure or by salting out with sodium chloride or potassium chloride.

Alternatively, the dye solution obtained can also be buffered at pH 5.5–6 by addition of a phosphate buffer and be adjusted by further dilution or concentration to provide a liquid brand of defined strength.

The dye obtained, which is according to the invention, dyes cotton in yellowish red shades having good general fastnesses.

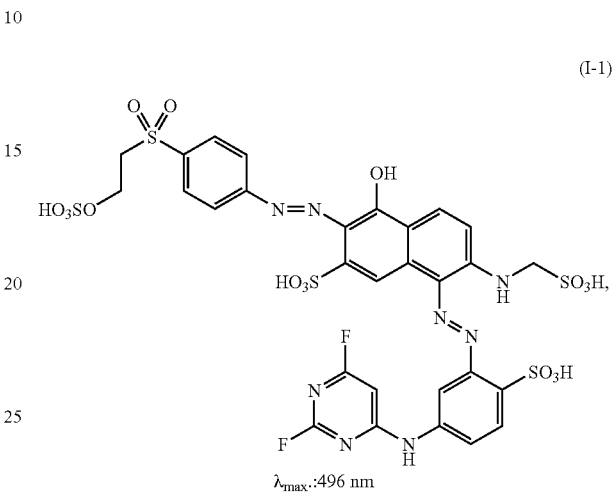

(I-1)

$\lambda_{max}$.:496 nm

EXAMPLE 2 a) 361 parts of 2-amino-5-(β-sulfatoethylsulfonyl)-benzenesulfonic acid are suspended in a mixture of 1 500 parts of water and 300 parts of concentrated sulfuric acid and diazotized at 10° C. by dropwise addition of 175 parts of 40% sodium nitrite solution. After the excess nitrite has been removed with sulfamic acid 239 parts are added of 7-amino-4-hydroxy-naphthalene-2-sulfonic acid in the form of an aqueous solution (pH 6.5–7) and a coupling reaction is carried out at 5–10° C. and below pH 1.3 to form a red monoazo dye of the formula (13-2).

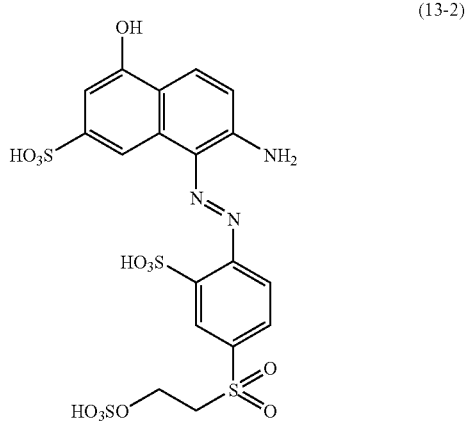

(13-2)

b) In a second, separate reaction vessel, 302 parts of the product obtained by condensation of 134 parts of 2,4,6-trifluoro-pyrimidine with 180 parts of 2,4-diaminobenzene sulfonic acid are suspended in 3 000 parts of water and admixed with 175 parts of 40% sodium nitrite solution. This mixture is added dropwise to an initial charge of 1 000 parts of ice and 330 parts of 30% hydrochloric acid and the batch is subsequently stirred at 10° C. until diazotization is complete. Subsequently the excess nitrite is removed with sulfamic acid solution and the diazo suspension obtained is pumped after the first coupling has ended into the solution of the monoazo dye (13-2) of a) while at the same time pH 5–6 is set and maintained with sodium carbonate at below 15° C.

The yellowish red disazo dye of the formula (1-2) formed after the second coupling reaction has ended can be isolated by evaporation under reduced pressure, where appropriate after the reaction solution has been demineralized. The dye obtained, which is according to the invention, dyes cotton in yellowish red shades having good general fastnesses.

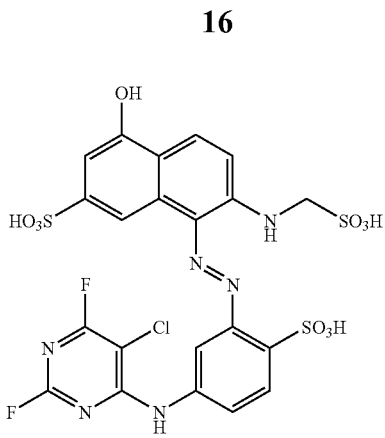

(13-3)

After the first coupling to the monoazo dye (13-3) has ended, pH 5–6 is set with sodium carbonate at below 25° C. and maintained with sodium carbonate until the second coupling reaction has ended. The resulting yellowish red disazo dye of the formula (I-3) can be isolated by evaporation under reduced pressure. The dye obtained, which is according to the invention, dyes cotton in yellowish red shades having good general fastnesses.

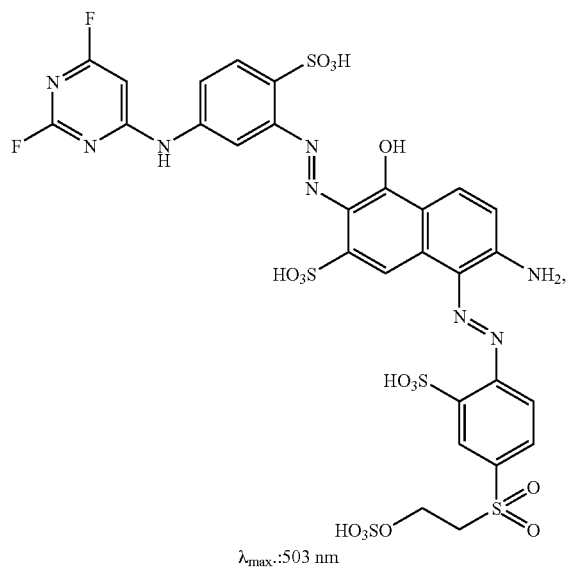

(I-2)

λ_max.: 503 nm

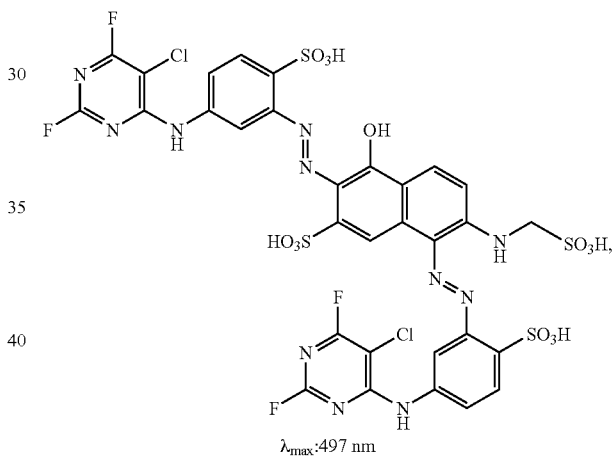

(I-3)

λ_max: 497 nm

EXAMPLES 4 TO 70

The table examples hereinbelow describe further dyes of the general formula (Iaa) according to the invention. The dyes provide yellowish to brown red dyeings, on cotton for example, that have good general fastnesses by the dyeing methods customary for reactive dyes.

EXAMPLE 3

336.5 parts of the product obtained by condensation of 168.5 parts of 5-chloro-2,4,6-trifluoro-pyrimidine with 188 parts of 2,4-diaminobenzenesulfonic acid are diazotized similarly to example 1a) or 2b) and, after removal of the excess nitrite with sulfamic acid, admixed with 166.5 parts of 4-hydroxy-7-(sulfomethyl-amino)-naphthalene-2-sulfonic acid (prepared by reaction of 119.5 parts of 7-amino-4-hydroxy-naphthalene-2-sulfonic acid with 74 parts of formaldehyde sodium bisulfite in an aqueous medium at pH 5.5–6 and 40–50° C.) and coupled in a first stage at 5–10° C. and below pH 1.5 to form a reddish orange monoazo dye of the formula (13-3).

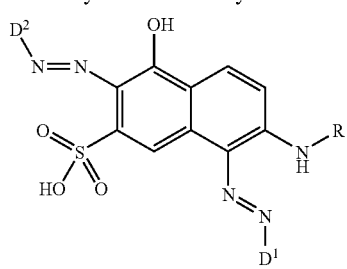

(Iaa)

Dyes as per example 1 or 2

| Example | D¹ | D² | R |
|---|---|---|---|
| 4 | 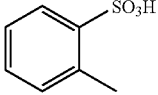 | 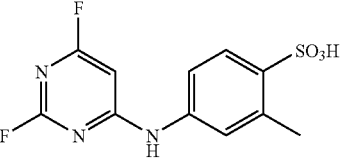 | CH₂—SO₃H |
| 5 | 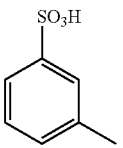 | 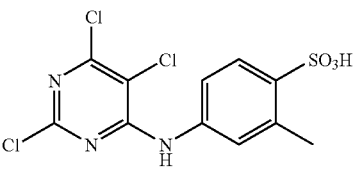 | CH₂—SO₃H |
| 6 | 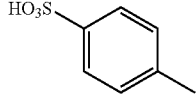 | 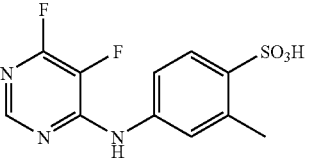 | CH₂—SO₃H |
| 7 | 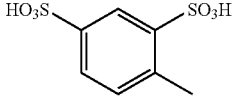 | 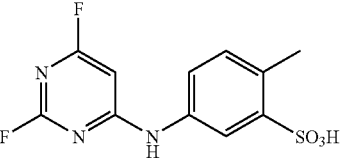 | H |
| 8 | 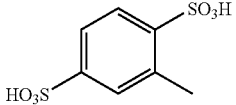 | 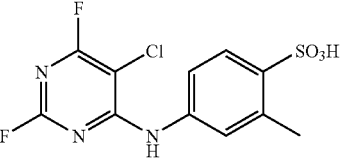 | H |
| 9 | 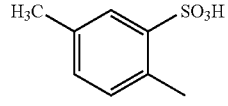 | 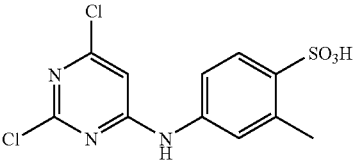 | H |
| 10 | 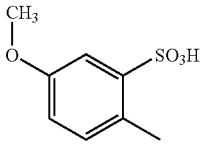 | 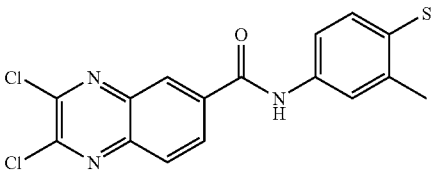 | CH₂—SO₃H |
| 11 | 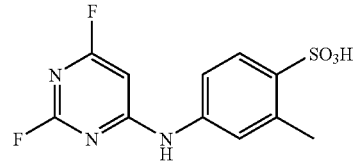 | 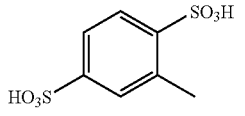 | H |

-continued

| Example | D¹ | D² | R |
|---|---|---|---|
| 12 | 2,6-difluoropyrimidin-4-yl-NH-(4-methyl-3-sulfophenyl) | 2,5-dimethylbenzenesulfonic acid | CH₂—SO₃H |
| 13 | 5-chloro-2,6-difluoropyrimidin-4-yl-NH-(3-methyl-4-sulfophenyl) | 2-methylbenzenesulfonic acid | CH₂—SO₃H |
| 14 | 2,5,6-trichloropyrimidin-4-yl-NH-(3-methyl-4-sulfophenyl) | 4-methylbenzene-1,3-disulfonic acid | H |
| 15 | 5,6-difluoropyrimidin-4-yl-NH-(3-methyl-4-sulfophenyl) | 4-methylbenzenesulfonic acid (with HO₃S) | CH₂—SO₃H |
| 16 | 2,6-dichloropyrimidin-4-yl-NH-(3-methyl-4-sulfophenyl) | 5-methoxy-2-methylbenzenesulfonic acid | CH₂—SO₃H |
| 17 | 2,3-dichloroquinoxaline-6-carbonyl-NH-(3-methyl-4-sulfophenyl) | 3-methylbenzenesulfonic acid | CH₂—SO₃H |
| 18 | 2-methylnaphthalene-1-sulfonic acid | 2,3-dichloroquinoxaline-6-carbonyl-NH-(3-methyl-4-sulfophenyl) | CH₂—SO₃H |
| 19 | 6-methylnaphthalene-1,5-disulfonic acid | 2,6-difluoropyrimidin-4-yl-NH-(3-methyl-4-sulfophenyl) | CH₂—SO₃H |

-continued

| Example | D¹ | D² | R |
|---|---|---|---|
| 20 | 3-methylnaphthalene-1,5-disulfonic acid | 4-[(2,6-dichloropyrimidin-4-yl)amino]-2-methylbenzenesulfonic acid | H |
| 21 | 7-methylnaphthalene-1,3,6-trisulfonic acid | 4-[(5-chloro-2,6-difluoropyrimidin-4-yl)amino]-2-methylbenzenesulfonic acid | H |
| 22 | 4-[(5,6-difluoropyrimidin-4-yl)amino]-2-methylbenzenesulfonic acid | 2-methylnaphthalene-1-sulfonic acid | CH₂—SO₃H |
| 23 | 4-[(5-chloro-2,6-difluoropyrimidin-4-yl)amino]-2-methylbenzenesulfonic acid | 6-methylnaphthalene-1,5-disulfonic acid | CH₂—SO₃H |
| 24 | 4-[(2,3-dichloroquinoxaline-6-carbonyl)amino]-2-methylbenzenesulfonic acid | 3-methylnaphthalene-1,5-disulfonic acid | H |
| 25 | 4-[(2,6-difluoropyrimidin-4-yl)amino]-2-methylbenzenesulfonic acid | 7-methylnaphthalene-1,3,6-trisulfonic acid | H |
| 26 | 2-[(4-methylphenyl)sulfonyl]ethyl hydrogen sulfate | 4-[(2,6-difluoropyrimidin-4-yl)amino]-2-methylbenzenesulfonic acid | CH₂—SO₃H |
| 27 | 2-[(3-methylphenyl)sulfonyl]ethyl hydrogen sulfate | 4-[(2,3-dichloroquinoxaline-6-carbonyl)amino]-2-methylbenzenesulfonic acid | H |

-continued

| Example | D¹ | D² | R |
|---|---|---|---|
| 28 | 2-methylphenyl-SO₂-CH₂CH₂-OSO₃H | 6-fluoro-5-chloro-2-fluoropyrimidin-4-yl-NH-(3-methyl-4-sulfophenyl) | H |
| 29 | 4-methyl-3-sulfo(Na)-phenyl-SO₂-CH₂CH₂-OSO₃Na | 6-fluoro-2-fluoropyrimidin-4-yl-NH-(3-methyl-4-sulfophenyl) | CH₂—SO₃H |
| 30 | 4-methoxy-3-methylphenyl-SO₂-CH₂CH₂-OSO₃Na | 2,6-dichloro-5-chloropyrimidin-4-yl-NH-(3-methyl-4-sulfophenyl) | H |
| 31 | 5-methoxy-2-methyl-4-methylphenyl-SO₂-CH₂CH₂-OSO₃Na | 6-fluoro-5-fluoropyrimidin-4-yl-NH-(3-methyl-4-sulfophenyl) | CH₂—SO₃H |
| 32 | 2,5-dimethoxy-4-methylphenyl-SO₂-CH₂CH₂-OSO₃H | 2,6-dichloropyrimidin-4-yl-NH-(3-methyl-4-sulfophenyl) | CH₂—SO₃H |
| 33 | 4-carboxy-3-methylphenyl-SO₂-CH₂CH₂-OSO₃H | 6-fluoro-5-chloro-2-fluoropyrimidin-4-yl-NH-(3-methyl-4-sulfophenyl) | CH₂—SO₃H |
| 34 | 7-methyl-8-sulfo-naphthalen-2-yl-SO₂-CH₂CH₂-OSO₃H | 6-fluoro-2-fluoropyrimidin-4-yl-NH-(3-methyl-4-sulfophenyl) | CH₂—SO₃H |
| 35 | 6-fluoro-5-chloro-2-fluoropyrimidin-4-yl-NH-(3-methyl-4-sulfophenyl) | 4-methylphenyl-SO₂-CH₂CH₂-OSO₃H | CH₂—SO₃H |

-continued

| Example | D¹ | D² | R |
|---|---|---|---|
| 36 | 2,3-dichloroquinoxaline-6-carboxamide of 4-sulfo-2-methylaniline | 2-(sulfooxy)ethylsulfonyl-(3-methylphenyl) | CH₂—SO₃H |
| 37 | 2,6-difluoropyrimidin-4-ylamino-(3-methyl-4-sulfophenyl) | 2-(sulfatoethyl)sulfonyl-(4-methyl-3-sulfonatophenyl), Na salts | H |
| 38 | 5,6-difluoropyrimidin-4-ylamino-(3-methyl-4-sulfophenyl) | 2-(sulfatoethyl)sulfonyl-(4-methoxy-3-methylphenyl), Na salt | H |
| 39 | 2,6-dichloropyrimidin-4-ylamino-(3-methyl-4-sulfophenyl) | 2-(sulfatoethyl)sulfonyl-(5-methoxy-2,4-dimethylphenyl), Na salt | CH₂—SO₃H |
| 40 | 2,6-difluoropyrimidin-4-ylamino-(3-methyl-4-sulfophenyl) | 2-(sulfooxy)ethylsulfonyl-(2,5-dimethoxy-4-methylphenyl) | CH₂—SO₃H |
| 41 | 2,6-difluoropyrimidin-4-ylamino-(3-methyl-4-sulfophenyl) | 4-[2-(sulfooxy)ethylsulfonyl]-2-methylbenzoic acid | CH₂—SO₃H |
| 42 | 5-chloro-2,6-difluoropyrimidin-4-ylamino-(3-methyl-4-sulfophenyl) | 2-(sulfooxy)ethylsulfonyl-(7-methyl-8-sulfonaphth-2-yl) | CH₂—SO₃H |
| 43 | 4-[2-(sulfooxy)ethylsulfonyl]phenyl-4'-methylbenzamide | 2,6-difluoropyrimidin-4-ylamino-(3-methyl-4-sulfophenyl) | CH₂—SO₃H |

-continued

| Example | D¹ | D² | R |
|---|---|---|---|
| 44 | 4-methyl-N-[3-(2-sulfooxyethylsulfonyl)phenyl]benzamide | 5-chloro-2,6-difluoro-4-[(4-sulfo-3-methylphenyl)amino]pyrimidine | CH₂—SO₃H |
| 45 | N-phenyl-N-[2-(2-sulfooxyethylsulfonyl)ethyl]-3-methylbenzamide | 2,6-difluoro-4-[(4-sulfo-3-methylphenyl)amino]pyrimidine | H |
| 46 | N-methyl-N-[2-(2-sulfonatooxyethylsulfonyl)ethyl]-3-methylbenzamide (Na salt) | 5-chloro-2,6-difluoro-4-[(4-sulfo-3-methylphenyl)amino]pyrimidine | H |
| 47 | 5-chloro-2,6-difluoro-4-[(4-sulfo-3-methylphenyl)amino]pyrimidine | 4-methyl-N-[4-(2-sulfooxyethylsulfonyl)phenyl]benzamide | CH₂—SO₃H |
| 48 | 2,6-difluoro-4-[(4-sulfo-3-methylphenyl)amino]pyrimidine | 4-methyl-N-[3-(2-sulfooxyethylsulfonyl)phenyl]benzamide | H |

-continued

| Example | D¹ | D² | R |
|---|---|---|---|
| 49 | 5-chloro-2,6-difluoropyrimidin-4-yl amino-2-methylbenzenesulfonic acid | N-phenyl-N-[2-(2-sulfatoethylsulfonyl)ethyl]-3-methylbenzamide | CH₂—SO₃H |
| 50 | 2,6-difluoropyrimidin-4-yl amino-2-methylbenzenesulfonic acid | N-methyl-N-[2-(2-sulfatoethylsulfonyl)ethyl]-3-methylbenzamide (Na salt) | H |
| 51 | 2,6-difluoropyrimidin-4-yl amino-2-methylbenzenesulfonic acid | 5-chloro-2,6-difluoropyrimidin-4-yl amino-2-methylbenzenesulfonic acid | CH₂—SO₃H |
| 52 | 2,6-difluoropyrimidin-4-yl amino-4-methyl-1,3-benzenedisulfonic acid | 2,6-dichloropyrimidin-4-yl amino-2-methylbenzenesulfonic acid | CH₂—SO₃H |
| 53 | 5-chloro-2,6-difluoropyrimidin-4-yl amino-2-methylbenzenesulfonic acid | 2,6-difluoropyrimidin-4-yl amino-2-methylbenzenesulfonic acid | H |
| 54 | 2,5,6-trichloropyrimidin-4-yl amino-2-methylbenzenesulfonic acid | 2,3-dichloroquinoxaline-6-carboxamido-2-methylbenzenesulfonic acid | H |
| 55 | 5,6-dichloropyrimidin-4-yl amino-2-methylbenzenesulfonic acid | 5,6-difluoropyrimidin-4-yl amino-2-methylbenzenesulfonic acid | H |

-continued

| Example | D¹ | D² | R |
|---|---|---|---|
| 56 | 4,5-difluoropyrimidin-6-yl-NH-(2-methyl-4-sulfo)phenyl | 2,3-dichloroquinoxaline-6-carboxamido-N-(2-methyl-4-sulfo)phenyl | H |
| 57 | 5-chloro-6-fluoropyrimidin-4-yl-NH-(2-methyl-4-sulfo)phenyl | 5-chloro-2,6-difluoropyrimidin-4-yl-NH-(2-methyl-4-sulfo)phenyl | CH₂—SO₃H |
| 58 | 2,6-dichloropyrimidin-4-yl-NH-(2-methyl-4-sulfo)phenyl | 2,6-difluoropyrimidin-4-yl-NH-(2-methyl-4-sulfo)phenyl | CH₂—SO₃H |
| 59 | 6-chloropyrimidin-4-yl-NH-(2-methyl-4-sulfo)phenyl | 2,6-difluoropyrimidin-4-yl-NH-(2-methyl-4-sulfo)phenyl | H |
| 60 | 6-fluoropyrimidin-4-yl-NH-(2-methyl-4-sulfo)phenyl | 5-chloro-2,6-difluoropyrimidin-4-yl-NH-(2-methyl-4-sulfo)phenyl | CH₂—SO₃H |
| 61 | 5-chloro-2,6-difluoropyrimidin-4-yl-NH-(2-methyl-4-sulfo)phenyl | 2,3-dichloroquinoxaline-6-carboxamido-N-(2-methyl-4-sulfo)phenyl | CH₂—SO₃H |
| 62 | 2,3-dichloroquinoxaline-6-carboxamido-N-(2-methyl-4-sulfo)phenyl | 2,6-difluoropyrimidin-4-yl-NH-(2-methyl-4-sulfo)phenyl | CH₂—SO₃H |
| 63 | 2,3-dichloroquinoxaline-6-carboxamido-N-(4-methyl-3-sulfo)phenyl | 5-chloro-2,6-difluoropyrimidin-4-yl-NH-(2-methyl-4-sulfo)phenyl | H |

-continued

| Example | D¹ | D² | R |
|---|---|---|---|
| 64 | 4-(β-sulfatoethylsulfonyl)phenylamino-6-fluoro-1,3,5-triazin-2-ylamino linked to 4-sulfo-3-methylphenyl | 2,6-difluoropyrimidin-4-yl-amino linked to 4-sulfo-3-methylphenyl | H |
| 65 | N-phenyl-N-(2-(β-sulfatoethylsulfonyl)ethyl)amino-6-fluoro-1,3,5-triazin-2-ylamino linked to 4-methyl-3-sulfophenyl | 2,6-difluoro-5-chloropyrimidin-4-ylamino linked to 4-sulfo-3-methylphenyl | CH₂—SO₃H |
| 66 | 2,6-difluoro-5-chloropyrimidin-4-ylamino linked to 4-sulfo-3-methylphenyl | 4-(β-sulfatoethylsulfonyl)phenylamino-6-fluoro-1,3,5-triazin-2-ylamino linked to 4-sulfo-3-methylphenyl | CH₂—SO₃H |
| 67 | 2,6-difluoropyrimidin-4-yl-amino linked to 4-sulfo-3-methylphenyl | N-phenyl-N-(2-(β-sulfatoethylsulfonyl)ethyl)amino-6-fluoro-1,3,5-triazin-2-ylamino linked to 4-methyl-3-sulfophenyl | H |
| 68 | 2,6-difluoropyrimidin-4-yl-amino linked to 4-sulfo-3-methylphenyl | 2,6-dichloro-1,3,5-triazin-4-ylamino linked to 4-sulfo-3-methylphenyl | CH₂—SO₃H |

-continued

| Example | D¹ | D² | R |
|---|---|---|---|
| 69 | 2,6-difluoropyrimidin-4-yl-NH-(2-methyl-4-sulfophenyl) | 2-cyanamido-6-chloro-1,3,5-triazin-4-yl-NH-(2-methyl-4-sulfophenyl) | H |
| 70 | 2-cyanamido-6-chloro-1,3,5-triazin-4-yl-NH-(2-methyl-4-sulfophenyl) | 5-chloro-2,6-difluoropyrimidin-4-yl-NH-(2-methyl-4-sulfophenyl) | CH₂—SO₃H |

EXAMPLES 71 TO 82

The table examples hereinbelow describe further dyes of the general formula (Iab) according to the invention. The dyes provide yellowish to brown red dyeings, on cotton for example, that have good general fastnesses by the dyeing methods customary for reactive dyes.

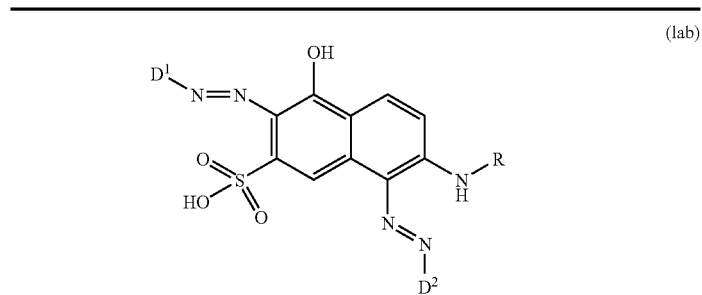

(Iab)

Dyes as per example 3:

| Example | D¹ = D² | R |
|---|---|---|
| 71 | 2,6-difluoropyrimidin-4-yl-NH-(2-methyl-4-sulfophenyl) | CH₂—SO₃H |
| 72 | 2,6-difluoropyrimidin-4-yl-NH-(4-methyl-3-sulfophenyl) | H |
| 73 | 5-chloro-2,6-difluoropyrimidin-4-yl-NH-(4-methyl-3-sulfophenyl) | CH₂—SO₃H |

-continued (Iab)

[Structure: naphthalene with OH, D¹-N=N-, HO₃S-, -NH-R, and -N=N-D² substituents]

Dyes as per example 3:

| Example | D¹ = D² | R |
|---------|---------|---|
| 74 | 2,5,6-trichloropyrimidin-4-yl-NH-(4-sulfo-2-methylphenyl) | CH₂—SO₃H |
| 75 | 5,6-dichloropyrimidin-4-yl-NH-(4-sulfo-2-methylphenyl) | H |
| 76 | 5,6-difluoropyrimidin-4-yl-NH-(4-sulfo-2-methylphenyl) | CH₂—SO₃H |
| 77 | 5-chloro-6-fluoropyrimidin-4-yl-NH-(4-sulfo-2-methylphenyl) | H |
| 78 | 2,6-dichloropyrimidin-4-yl-NH-(4-sulfo-2-methylphenyl) | CH₂—SO₃H |
| 79 | 6-chloropyrimidin-4-yl-NH-(4-sulfo-2-methylphenyl) | H |
| 80 | 6-fluoropyrimidin-4-yl-NH-(4-sulfo-2-methylphenyl) | H |

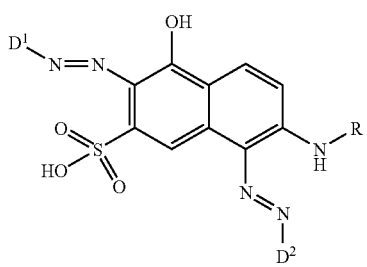

(Iab)

Dyes as per example 3:

| Example | $D^1 = D^2$ | R |
|---|---|---|
| 81 | (3,4-dichloroquinoxaline-6-carbonyl-amino-4-sulfo-2-methylphenyl) | $CH_2-SO_3H$ |
| 82 | (3,4-dichloroquinoxaline-6-carbonyl-amino-4-methyl-3-sulfophenyl) | H |

USE EXAMPLE 1

2 parts of a dye obtained according to example 1–3 and 50 parts of sodium chloride are dissolved in 999 parts of water and 5 parts of sodium carbonate, 0.7 part of sodium hydroxide (in the form of a 32.5% aqueous solution) and optionally 1 part of a wetting agent are added. The dyebath is entered with 100 g of a cotton fabric. The temperature of the dyebath is first maintained at 25° C. for 10 minutes, then raised over 30 minutes to the final temperature (40–80° C.) and maintained at that level for a further 60–90 minutes. Thereafter, the dyed material is rinsed initially with tap water for 2 minutes and then with ion-free water for 5 minutes. The dyed material is neutralized at 40° C. in 1 000 parts of an aqueous solution containing 1 part of 50% acetic acid for 10 minutes. It is subsequently rinsed with ion-free water at 70° C. and thereafter soaked off at the boil with a detergent for 15 minutes, rinsed once more and dried. This gives a strong yellowish to brownish red dyeing having very good fastness properties.

USE EXAMPLE 2

2 parts of a dye obtained as per example 3, 43, 44, 47, 48 or 68 are dissolved in 999 parts of water and 5 parts of sodium carbonate, 0.7 part of sodium hydroxide (in the form of a 32.5% aqueous solution) and optionally 1 part of a wetting agent are added. This dyebath is entered with 100 g of a cotton fabric. The rest of the processing is as indicated in use example 1. This gives a strong yellowish to brownish red dyeing having very good fastness properties.

USE EXAMPLE 3

4 parts of a dye obtained as per example 3, 43, 44, 47, 48 or 68 and 5 parts of sodium chloride are dissolved in 999 parts of water, 7 parts of sodium carbonate, 0.7 part of sodium hydroxide (in the form of a 32.5% aqueous solution) and optionally 1 part of a wetting agent are added. This dyebath is entered with 100 g of a cotton fabric. The rest of the processing is as indicated in use example 1. This gives a strong yellowish to brownish red dyeing having very good fastness properties.

USE EXAMPLE 4

8 parts of a dye obtained as per example 3, 43, 44, 47, 48 or 68 and 10 parts of sodium chloride are dissolved in 997 parts of water, 10 parts of sodium carbonate, 1.3 part of sodium hydroxide (in the form of a 32.5% aqueous solution) and optionally 1 part of a wetting agent are added. This dyebath is entered with 100 g of a cotton fabric. The rest of the processing is as indicated in use example 1. This gives a strong yellowish to brownish red dyeing having very good fastness properties.

I claim:

1. Reactive dyes as per the hereinbelow indicated and defined general formula (I),

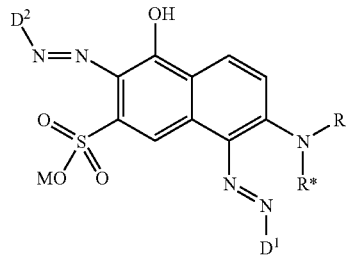

(I)

where
D¹ and D² are independently a group of the general formula (1)

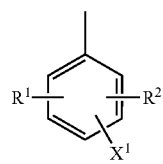

(1)

where
R¹ and R² are independently hydrogen, $(C_1-C_4)$-alkyl, $(C_1-C_4)$-alkoxy, hydroxyl, sulfo, carboxyl, cyano, nitro, amido, ureido or halogen; and
X¹ is hydrogen or a group of the formula —SO$_2$-Z, where Z is —CH=CH$_2$, —CH$_2$CH$_2$Z¹ or hydroxyl, where Z¹ is hydroxyl or an alkali-detachable group; or
D¹ and D² are independently a naphthyl group of the general formula (2)

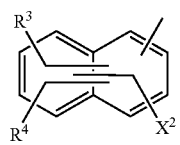

(2)

where
R³ and R⁴ are independently hydrogen, $(C_1-C_4)$-alkyl, $(C_1-C_4)$-alkoxy, hydroxyl, sulfo, carboxyl, cyano, nitro, amido, ureido or halogen; and
X² has one of the meanings of X¹; or
D¹ and D² are independently a group of the general formula (3)

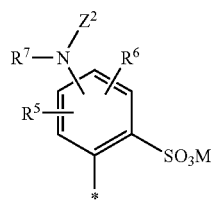

(3)

where
R⁵ and R⁶ independently have one of the meanings of R¹ and R²;

R⁷ is hydrogen, $(C_1-C_4)$-alkyl, unsubstituted or $(C_1-C_4)$-alkyl-, $(C_1-C_4)$-alkoxy-, sulfo-, halogen- or carboxyl-substituted phenyl; and
Z² a group of the general formula (4) or (5) or (6);

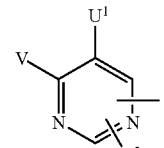

(4)

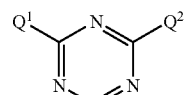

(5)

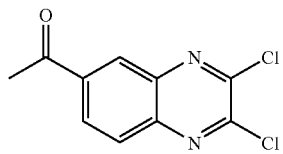

(6)

where
V is fluorine or chlorine;
U¹, U² are independently fluorine, chlorine or hydrogen; and
Q¹, Q² are independently chlorine, fluorine, cyanamido, hydroxyl, $(C_1-C_6)$-alkoxy, phenoxy, sulfophenoxy, mercapto, $(C_1-C_6)$-alkymercapto, pyridino, carboxypyridino, carbamoylpyridino or a group of the general formula (7) or (8)

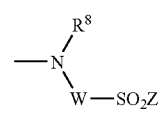

(7)

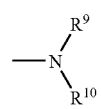

(8)

where
R⁸ is hydrogen or $(C_1-C_6)$-alkyl, or phenyl unsubstituted or substituted by $(C_1-C_4)$-alkyl, $(C_1-C_4)$-alkoxy, sulfo, halogen, carboxyl, acetamido, ureido;
R⁹ and R¹⁰ independently have one of the meanings of R⁸ or combine to form a cyclic ring system of the formula —(CH$_2$)$_i$—, where i is 4 or 5, or alternatively —(CH$_2$)$_2$-E-(CH$_2$)$_2$—, where E is oxygen, sulfur, sulfo, —NR¹¹ where R¹¹=$(C_1-C_6)$-alkyl;
W is phenylene which is unsubstituted or substituted by 1 or 2 substituents, such as $(C_1-C_4)$-alkyl, $(C_1-C_4)$-alkoxy, carboxyl, sulfo, chlorine, bromine, or is $(C_1-C_4)$-alkylene-arylene or $(C_2-C_6)$-alkylene, which can be interrupted by oxygen, sulfur, sulfo, amino, carbonyl, carboxamido, or is phenylene-CONH-phenylene, which is unsubstituted or substituted by $(C_1-C_4)$-alkyl, $(C_1-C_4)$-alkoxy, hydroxyl, sulfo, carboxyl, amido, ureido or halogen, or is naphthylene which is unsubstituted or substituted by 1 or 2 sulfo groups; and Z is as defined above; or $D^1$ and $D^2$ are independently a group of the general formula (9)

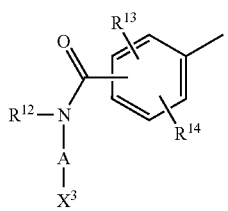
(9)

where $R^{12}$ is hydrogen, $(C_1-C_4)$-alkyl, aryl or a substituted aryl radical;

$R^{13}$ and $R^{14}$ are independently hydrogen, $(C_1-C_4)$-alkyl, $(C_1-C_4)$-alkoxy, hydroxyl, sulfo, carboxyl, cyano, nitro, amido, ureido or halogen; and A is a phenylene group of the general formula (10)

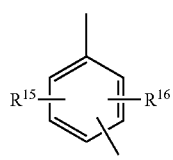
(10)

where $R^{15}$ and $R^{16}$ are independently hydrogen, $(C_1-C_4)$-alkyl, $(C_1-C_4)$-alkoxy, hydroxyl, sulfo, carboxyl, cyano, nitro, amido, ureido or halogen; or a naphthylene group of the general formula (11)

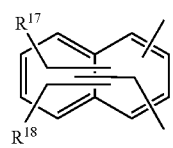
(11)

where $R^{17}$ and $R^{18}$ are independently hydrogen, $(C_1-C_4)$-alkyl, $(C_1-C_4)$-alkoxy, hydroxyl, sulfo, carboxyl, cyano, nitro, amido, ureido or halogen; or a polymethylene group of the general formula (12)

$$-(CR^{19}R^{20})_k-\quad(12)$$

where k is a whole number greater than 1 and $R^{19}$ and $R^{20}$ are independently hydrogen, $(C_1-C_4)$-alkyl, $(C_1-C_4)$-alkoxy, hydroxyl, cyano, amido, halogen or aryl; and $X^3$ has one of the meanings of $X^1$; and R, R* are independently hydrogen, $(C_1-C_4)$-alkyl or sulfomethyl; and M is hydrogen, an alkali metal or one equivalent of an alkaline earth metal, with the proviso that the dyes of the general formulae (I) contain at least one fiber-reactive heterocyclic group of the general formula (4) or (6).

2. Reactive dyes as per claim 1, where the substituents R are hydrogen or sulfomethyl and R* is hydrogen.

3. Reactive dyes as per claim 1, wherein the substituents $R^1$ and $R^2$ are hydrogen, methyl, methoxy or sulfa, $R^{12}$ to $R^{16}$ are hydrogen and $R^3$ to $R^6$, $R^7$ and $R^{18}$ are hydrogen or sulfo, $R^7$ and $R^8$ are hydrogen, methyl or phenyl and $R^9$ and $R^{10}$ are hydrogen, methyl 2-sulfoethyl, 2-, 3- or 4-sulfophenyl, or $R^9$ and $R^{10}$ combine to form a cyclic ring system which conforms to the formula $-(CH_2)_2-O-(CH_2)_2-$.

4. Reactive dyes as per claim 1, wherein Z is vinyl, β-chloro ethyl or β-sulfatoethyl.

5. Reactive dyes as claimed in claim 1, wherein $Q^1$ and $Q^2$ in the general formula (5) are independently fluorine, chlorine, cyanamido, morpholino, 2-sulfophenylamino, 3-sulfophenylamino, 4-sulfophenylamino, 3-(2-sulfatoethylsulfonyl)phenylamino, 4-(2-sulfatoethylsulfonyl)phenylamino, 3-(vinylsulfonyl)phenylamino, 4-(vinylsulfonyl)phenylamino, N-methyl-N-(2-(2-sulfatoetylsulfonyl)ethyl)amino or N-phenyl-N-(2-(2-sulfatoethyl-sulfonyl)ethyl)amino.

6. A process for preparing dyes of the general formula (I) as per claim 1, which comprises diazotizing one equivalent of an amine of the general formula (16)

$$D^1\text{-}NH_2 \quad (16),$$

where $D^1$ is as defined in 1 claim and the resulting diazonium compound being reacted in a first stage with an aqueous solution or suspension of one equivalent of a coupling component as per the general formula (17)

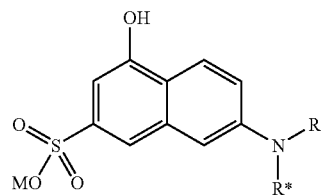
(17)

where R, R* and M are each as defined in claim 1, to form a monoazo dye as per the general formula (13)

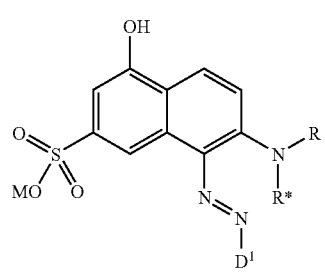
(13)

and subsequently one equivalent of an amine of the general formula (18)

$$D^2\text{-}NH_2 \quad (18),$$

where $D^2$ is as defined in claim 1, being diazotized and the resulting diazonium compound being coupled in the second stage with the monoazo dye of the general formula (13) obtained in the first stage to form the disazo dye of the general formula (I).

7. The process for preparing dyes of the general formula (I) as per claim 1 in the event that the groups $D^1$ and $D^2$ as per the general formulae (I) have the same meaning by two equivalents of an amine of the general formula (16)

$$D^1\text{-}NH_2 \qquad (16),$$

where $D^1$ is as defined in claim 1 which comprises diazotizing and reacting in a first stage with one equivalent of a coupling component of the general formula (17)

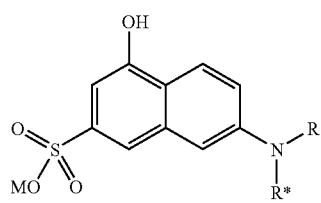

(17)

to form monoazo dye of the general formula (13)

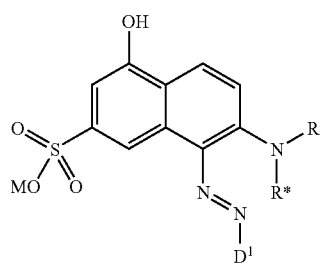

(13)

and the second coupling to the disazo dye of the general formula (I) where the groups $D^1$ and $D^2$ have the same meaning being carried out subsequently.

8. An aqueous liquid preparation containing a dye as set forth in claim 1 at a level of 5–90% by weight.

9. Reactive dyes as per claim 1 where the substituents R are hydrogen or sulfomethyl and R* is hydrogen.

10. Reactive dyes as per claim 9, wherein the substituents $R^1$ and $R^2$ are hydrogen, methyl, methoxy or sulfo, $R^{12}$ to $R^{16}$ are hydrogen and to $R^3$, $R^6$, $R^{17}$ and $R^{18}$ are hydrogen or sulfo, $R^7$ and $R^8$ are hydrogen methyl or phenyl and $R^9$ and $R^{10}$ are hydrogen, methyl 2-sulfoethyl, 2-, 3- or 4-sulfophenyl, or $R^9$ and $R^{10}$ combine to form a cyclic ring system which conforms to the formula —$(CH_2)_2$—O—$(CH_2)_2$—.

11. Reactive dyes as per claim 10, wherein Z is vinyl, β-chloroethyl or β-sulfatoethyl.

12. Reactive dyes as claimed in claim 11, wherein $Q^1$ and $Q^2$ in the general formula (5) are independently fluorine, chlorine, cyanamido, morpholino, 2-sulfophenylamino, 3-sulfophenylamino, 4-sulfophenylamino, 3-(2-sulfatoethylsulfonyl)phenylamino, 4-(2-sulfatoethylsulfonyl)phenylamino, 3-(vinylsulfonyl)phenylamino, 4-(vinylsulfonyl)phenylamino, N-methyl-N-(2-(2-sulfatoethylsulfonyl)ethyl) amino or N-phenyl-N-(2-(2-sulfatoethyl-sulfonyl)ethyl) amino.

13. A process of dyeing or printing hydroxyl- and/or carboxamido-containing fiber material which comprises contacting the reactive dyes as per claim 1 with said material.

* * * * *

UNITED STATES PATENT AND TRADEMARK OFFICE
CERTIFICATE OF CORRECTION

PATENT NO. : 7,132,515 B2
APPLICATION NO. : 10/511534
DATED : November 7, 2006
INVENTOR(S) : Joachim Eichhorn It is certified that error appears in the above-identified patent and that said Letters Patent is hereby corrected as shown below:

In Claim 1, at column 42, line 51, "$R^8$ is hydrogen or $(C_1-C_6)$-alkyl, or phenyl unsubstituted" should read -- $R^8$ is hydrogen or $(C_1-C_6)$-alkyl, sulfo-$(C_1-C_6)$-alkyl or phenyl unsubstituted --.

In Claim 2, at column 44, line 7, "$R^1$ and $R^2$ are hydrogen, methyl, methoxy or sulfa, $R^{12}$ to" should read -- $R^1$ and $R^2$ are hydrogen, methyl, methoxy or sulfo, $R^{12}$ to --.

In Claim 2, at column 44, line 8, "$R^{16}$ are hydrogen and $R^3$ to $R^6$, $R^7$ and $R^{18}$ are hydrogen or" should read -- $R^{16}$ are hydrogen and $R^3$ to $R^6$, $R^{17}$ and $R^{18}$ are hydrogen or --.

In Claim 10, at column 46, line 11, "$R^{16}$ are hydrogen and to $R^3$, $R^6$, $R^{17}$ and $R^{18}$ are hydrogen" should read -- $R^{16}$ are hydrogen and $R^3$ to $R^6$, $R^{17}$ and $R^{18}$ are hydrogen --.

Signed and Sealed this

Third Day of April, 2007

JON W. DUDAS
*Director of the United States Patent and Trademark Office*